US012039841B2

(12) United States Patent
Forman et al.

(10) Patent No.: US 12,039,841 B2
(45) Date of Patent: *Jul. 16, 2024

(54) SYSTEMS AND METHODS FOR PROVIDING ELECTRONIC GAMING PIECES

(71) Applicant: Planet Bingo, LLC, Palm Desert, CA (US)

(72) Inventors: David S. Forman, Palm Desert, CA (US); Rick G. White, Bermuda Dunes, CA (US)

(73) Assignee: Planet Bingo, LLC, Palm Desert, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/182,073

(22) Filed: Mar. 10, 2023

(65) Prior Publication Data

US 2023/0215246 A1 Jul. 6, 2023

Related U.S. Application Data

(63) Continuation of application No. 17/228,388, filed on Apr. 12, 2021, now Pat. No. 11,625,988, which is a continuation of application No. 15/642,974, filed on Jul. 6, 2017, now Pat. No. 11,004,311, which is a continuation of application No. 14/447,319, filed on Jul. 30, 2014, now Pat. No. 9,728,046.

(51) Int. Cl.
*G07F 17/32* (2006.01)

(52) U.S. Cl.
CPC ........ *G07F 17/329* (2013.01); *G07F 17/3225* (2013.01); *G07F 17/3241* (2013.01); *G07F 17/326* (2013.01); *G07F 17/3293* (2013.01)

(58) Field of Classification Search
CPC ............... G07F 17/325; G07F 17/3225; G07F 17/3241; G07F 17/326; G07F 17/3293
See application file for complete search history.

(56) References Cited

U.S. PATENT DOCUMENTS 4,856,787 A * 8/1989 Itkis .................... G07F 17/3262 273/237
5,042,809 A * 8/1991 Richardson ............. G07F 17/32 273/460
5,297,802 A * 3/1994 Pocock ................... A63F 13/30 463/19
5,324,035 A * 6/1994 Morris .................... G07F 17/32 463/41
5,393,057 A * 2/1995 Marnell .............. G07F 17/3276 463/19
(Continued)

*Primary Examiner* — David L Lewis
*Assistant Examiner* — Matthew D Hoel
(74) *Attorney, Agent, or Firm* — Bookoff McAndrews, PLLC

(57) ABSTRACT

Systems and methods are provided for providing playing cards. An exemplary method may include retrieving data related to a selection of a set of numbers for bingo and determining matching bingo patterns on a predetermined number of cards from a library of bingo cards against the set of selected numbers. The method may further include selecting corresponding playing cards based on the matching bingo patterns on the predetermined number of cards and providing the corresponding playing cards for display. The exemplary method may be used to deal playing cards for poker using a set of selected numbers.

30 Claims, 6 Drawing Sheets

(56) References Cited

U.S. PATENT DOCUMENTS 5,630,753 A * 5/1997 Fuchs ................ G07F 17/3227 463/9
5,647,798 A * 7/1997 Falciglia ................ G07F 17/34 463/19
5,882,260 A * 3/1999 Marks ................ G07F 17/3293 463/19
6,079,711 A * 6/2000 Wei ........................ A63F 1/00 273/274
6,117,009 A * 9/2000 Yoseloff .............. G07F 17/3244 463/20
6,159,096 A * 12/2000 Yoseloff .............. G07F 17/3244 463/20
6,398,645 B1 * 6/2002 Yoseloff .............. G07F 17/3262 463/19
6,402,614 B1 * 6/2002 Schneier ................ G07F 17/32 463/40
6,409,173 B1 * 6/2002 Tri ...................... A63F 3/00157 273/269
6,565,091 B2 * 5/2003 Weingardt ............ A63F 3/0645 273/274
6,569,017 B2 * 5/2003 Enzminger ......... G07F 17/3244 463/19
6,656,044 B1 * 12/2003 Lewis ................ G07F 17/3293 463/19
7,425,178 B1 * 9/2008 Odom .................... G07F 17/32 463/16
8,096,555 B1 * 1/2012 Odom .................... G07F 17/34 463/12
8,201,827 B2 * 6/2012 Weingardt ............ A63F 3/0645 463/19
8,333,647 B2 * 12/2012 Dimitriadis ........... A63F 3/0645 463/16
8,398,085 B2 * 3/2013 Forman .................. G07F 17/32 463/19
8,647,196 B1 * 2/2014 Colvin ................ G07F 17/3225 463/19
8,684,813 B2 * 4/2014 Arnone ............... G07F 17/3248 463/19
8,752,838 B2 * 6/2014 Weingardt .......... G07F 17/3286 463/19
8,900,057 B2 * 12/2014 Johnson .............. G07F 17/3223 463/16
8,951,108 B2 * 2/2015 Dimitriadis ........... A63F 3/0645 463/16
8,986,097 B2 * 3/2015 Arnone ............... G07F 17/3246 463/19
9,022,851 B2 * 5/2015 Colvin .................. G07F 17/326 463/19
9,067,131 B2 * 6/2015 Colvin ................ G07F 17/3286
9,092,935 B2 * 7/2015 Merati ................ G07F 17/3225
9,117,333 B2 * 8/2015 Nakamura ............. G07F 17/34
9,202,332 B2 * 12/2015 Bahou ..................... A63F 13/33
9,330,538 B2 * 5/2016 Konstakis ............. G07F 17/326
9,349,244 B2 * 5/2016 Weingardt .......... G07F 17/3272
9,401,076 B2 * 7/2016 Nakamura ............. G07F 17/32
9,443,396 B2 * 9/2016 Babineau .............. G07F 17/329
9,495,836 B2 * 11/2016 Johnson .............. G07F 17/3262
9,520,015 B2 * 12/2016 Colvin .................. A63F 3/0645
9,542,813 B2 * 1/2017 Gupta ................... G07F 17/326
9,545,569 B2 * 1/2017 Merati ................ G07F 17/3244
9,600,962 B2 * 3/2017 Weingardt .......... G07F 17/3258
9,607,480 B2 * 3/2017 Arnone ............... G07F 17/3248
9,728,046 B2 * 8/2017 Forman ............... G07F 17/3225
9,842,459 B2 * 12/2017 Merati ................ G07F 17/3293
9,844,731 B2 * 12/2017 Tamaoki ............... G07F 17/326
9,905,074 B2 * 2/2018 Merati ................ G07F 17/3293
10,089,820 B2 * 10/2018 Merati .................. G07F 17/326
10,204,489 B2 * 2/2019 Arnone ............... G07F 17/3246
10,210,714 B2 * 2/2019 Elias ..................... G07F 17/326
10,229,560 B2 * 3/2019 Weingardt .......... G07F 17/3276
10,242,531 B2 * 3/2019 Colvin ................ G07F 17/3262
10,255,753 B2 * 4/2019 Merati .................. G07F 17/329
10,319,191 B2 * 6/2019 Johnson ................. G06Q 50/34
10,332,333 B2 * 6/2019 Nakamura .............. G07F 17/34
10,339,764 B2 * 7/2019 Babineau .............. G07F 17/326
10,431,046 B2 * 10/2019 Hoover ............... G07F 17/3246
10,726,665 B2 * 7/2020 Martineck, Sr. .... G07F 17/3241
10,726,666 B2 * 7/2020 Martineck, Sr. .... G07F 17/3223
10,726,678 B1 * 7/2020 Rehill ................... G07F 17/326
10,810,839 B2 * 10/2020 Johnson .................. G07F 17/34
10,864,438 B2 * 12/2020 Iguchi ..................... A63F 13/25
11,004,311 B2 * 5/2021 Forman ............... G07F 17/3225
11,040,272 B2 * 6/2021 Packett ............... G07F 17/3227
11,049,357 B2 * 6/2021 Merati ................ G07F 17/3293
11,625,988 B2 * 4/2023 Forman ............... G07F 17/3241 463/19
2002/0103017 A1 * 8/2002 Odom ....................... A63F 1/00 463/13
2002/0132661 A1 * 9/2002 Lind .................. G07F 17/3251 463/19
2004/0048647 A1 * 3/2004 Lind .................. G07F 17/3232 463/19
2005/0059469 A1 * 3/2005 Gail ........................ G07F 17/32 463/19
2005/0101387 A1 * 5/2005 Wolf .................. G07F 17/3286 463/19
2005/0143158 A1 * 6/2005 Odom ..................... G07F 17/34 463/13
2006/0025189 A1 * 2/2006 Hollibaugh ............. G07F 17/32 463/11
2006/0025199 A1 * 2/2006 Harkins .............. G07F 17/3286 463/19
2006/0035700 A1 * 2/2006 Van Asdale ............. G07F 17/32 463/19
2006/0205468 A1 * 9/2006 Saffari .................... G07F 17/32 463/16
2007/0155472 A1 * 7/2007 Gail ........................ G07F 17/32 463/19
2010/0022291 A1 * 1/2010 Segreto ................... G07F 17/32 463/19
2012/0009987 A1 * 1/2012 Dumont ................ G07F 17/329 463/19
2012/0094743 A1 * 4/2012 Odom ................ G07F 17/3262 463/20
2012/0231867 A1 * 9/2012 Dimitriadis ........... G07F 17/329 463/19
2012/0244923 A1 * 9/2012 Wolf .................. G07F 17/3293 463/11
2012/0315975 A1 * 12/2012 Lind .................. G07F 17/3262 463/19
2013/0065660 A1 * 3/2013 Dimitriadis ........... G07F 17/329 463/31
2013/0079147 A1 * 3/2013 Merati ................ G07F 17/3244 463/42
2013/0084947 A1 * 4/2013 Nicely .................. G07F 17/326 463/22
2013/0143639 A1 * 6/2013 Nakamura ............. G07F 17/34 463/20
2013/0252693 A1 * 9/2013 Arnone ................. G07F 17/326 463/17
2013/0273994 A1 * 10/2013 Cobb .................... G07F 17/326 463/18
2014/0011560 A1 * 1/2014 Konstakis ............. G07F 17/326 463/17
2014/0073393 A1 * 3/2014 Colvin ................ G07F 17/3244 463/19
2014/0073394 A1 * 3/2014 Colvin ................ G07F 17/3211 463/19
2014/0073395 A1 * 3/2014 Colvin ................ G07F 17/3211 463/19
2014/0073396 A1 * 3/2014 Colvin ................ G07F 17/3225 463/19
2014/0073397 A1 * 3/2014 Colvin ................ G07F 17/3225 463/19
2014/0073398 A1 * 3/2014 Colvin ................ G07F 17/3267 463/19
2014/0073399 A1 * 3/2014 Colvin ................ G07F 17/3209 463/19

(56) References Cited

U.S. PATENT DOCUMENTS

2014/0073400 A1* 3/2014 Colvin .................. A63F 3/0645
463/19
2014/0073401 A1* 3/2014 Colvin ................ G07F 17/3211
463/19
2014/0073402 A1* 3/2014 Colvin ................ G07F 17/3262
463/19
2014/0080563 A1* 3/2014 Johnson .............. G07F 17/3225
463/20
2014/0080565 A1* 3/2014 Pececnik ............... G07F 17/326
463/17
2014/0087814 A1* 3/2014 Babineau ............ G07F 17/3209
463/17
2014/0100022 A1* 4/2014 Lewis ................. G07F 17/3244
463/25
2014/0194179 A1* 7/2014 Arnone ............... G07F 17/3248
463/17
2014/0200070 A1* 7/2014 Bahou ................. G07F 17/3244
463/25
2015/0080083 A1* 3/2015 Tamaoki ................. A63F 13/35
463/17
2015/0105134 A1* 4/2015 Cobb .................... G07F 17/326
463/18
2015/0105135 A1* 4/2015 Cobb .................. G07F 17/3244
463/18
2015/0141108 A1* 5/2015 Kadlec .................. G07F 17/326
463/17
2015/0141109 A1* 5/2015 Kadlec ................ G07F 17/3269
463/17
2015/0194010 A1* 7/2015 Arnone ................... G07F 17/42
463/17
2015/0221163 A1* 8/2015 Dimitriadis ........... A63F 3/0645
463/19
2015/0254933 A1* 9/2015 Johnson .............. G07F 17/3225
463/25
2015/0294527 A1* 10/2015 Kolomiiets ......... G07F 17/3288
463/17
2015/0325088 A1* 11/2015 Nakamura .......... G07F 17/3225
463/20
2015/0328544 A1* 11/2015 Merati .................. G07F 17/326
463/42
2016/0035176 A1* 2/2016 Forman ................. G07F 17/329
463/19
2016/0082358 A1* 3/2016 Bahou ..................... A63F 13/44
463/17
2016/0107075 A1* 4/2016 Colvin .................. A63F 3/0645
463/19
2016/0107076 A1* 4/2016 Colvin ................ G07F 17/3211
463/19
2016/0110946 A1* 4/2016 Colvin ................ G07F 17/3286
463/19
2016/0117884 A1* 4/2016 Weingardt .......... G07F 17/3272
463/19
2016/0217656 A1* 7/2016 Yarbrough ............. A63F 3/062
2016/0240042 A1* 8/2016 Weingardt .......... G07F 17/3258
2016/0247349 A1* 8/2016 Konstakis ............. G07F 17/329
2016/0300429 A1* 10/2016 Dimitriadis ........... G07F 17/326
2016/0307394 A1* 10/2016 Nakamura .............. G07F 17/34
2016/0343199 A1* 11/2016 Babineau ............ G07F 17/3209
2016/0358410 A1* 12/2016 Elias ..................... G07F 17/329
2017/0039801 A1* 2/2017 Arnone ................. G07F 17/326
2017/0046918 A1* 2/2017 Colvin ................ G07F 17/3244
2017/0076550 A1* 3/2017 Johnson .............. G07F 17/3223
2017/0186268 A1* 6/2017 Merati ................ G07F 17/3225
2017/0239557 A1* 8/2017 Dimitriadis ........... G07F 17/329
2017/0301176 A1* 10/2017 Forman ............... G07F 17/3225
2017/0323516 A1* 11/2017 Kadlec .................. G07F 17/329
2017/0323517 A1* 11/2017 Konstakis ............. G07F 17/329
2017/0323519 A1* 11/2017 Merati .................... A63F 13/30
2018/0047042 A1* 2/2018 Fukuzawa .......... G06Q 30/0209
2018/0053380 A1* 2/2018 Seymour ................. A63F 13/00
2018/0078847 A1* 3/2018 Sorreta ............... G07F 17/3272
2018/0182205 A1* 6/2018 Merati ....................... A63F 9/24
2018/0197365 A1* 7/2018 Konstakis ........... G07F 17/3225
2018/0250582 A1* 9/2018 Dimitriadis ......... G07F 17/3225
2018/0268654 A1* 9/2018 Johnson ................. G06Q 50/34
2019/0030428 A1* 1/2019 Iguchi ................. G07F 17/3225
2019/0035206 A1* 1/2019 Merati ................ G07F 17/3225
2019/0134492 A1* 5/2019 Dimitriadis ........... G07F 17/326
2019/0172302 A1* 6/2019 Wolf ................... G07F 17/3211
2019/0244475 A1* 8/2019 Merati ....................... A63F 9/24
2019/0325697 A1* 10/2019 Martineck, Sr. .... G07F 17/3227
2019/0325698 A1* 10/2019 Martineck, Sr. ...... G07F 17/323
2019/0347903 A1* 11/2019 Johnson .............. G07F 17/3272
2020/0038741 A1* 2/2020 Packett ................. A63F 3/0645
2020/0111284 A1* 4/2020 Konstakis ............. G07F 17/326
2021/0069585 A1* 3/2021 Iguchi ................. G07F 17/3244
2021/0125458 A1* 4/2021 Johnson .............. G07F 17/3258
2021/0233345 A1* 7/2021 Forman ............... G07F 17/3241
2021/0243500 A1* 8/2021 Petrov ................. G07F 17/3295
2021/0350655 A1* 11/2021 Merati ................ G07F 17/3213

* cited by examiner

300

DRAW POKER
POKER HAND

302

NUMBER OF COINS BET

| POKER HAND | 1 | 2 | 3 | 4 | 5 |
|---|---|---|---|---|---|
| ROYAL FLUSH | 250 | 500 | 750 | 1000 | 4000 |
| STRAIGHT FLUSH | 50 | 100 | 150 | 200 | 250 |
| FOUR OF A KIND (ACES) | 100 | 200 | 300 | 400 | 500 |
| FOUR OF A KIND (2'S, 3'S AND 4'S) | 50 | 100 | 150 | 200 | 250 |
| FOUR OF A KIND (5'S THROUGH KINGS) | 25 | 50 | 75 | 100 | 125 |
| FULL HOUSE | 7 | 14 | 21 | 28 | 35 |
| FLUSH | 5 | 10 | 15 | 20 | 25 |
| STRAIGHT | 4 | 8 | 12 | 16 | 20 |
| THREE OF A KIND | 2 | 4 | 6 | 8 | 10 |
| TWO PAIR | 1 | 2 | 3 | 4 | 5 |
| JACKS OR BETTER | 1 | 2 | 3 | 4 | 5 |

300

302

| DRAW POKER POKER HAND | NUMBER OF COINS BET 1 | 2 | 3 | 4 | 5 |
|---|---|---|---|---|---|
| ROYAL FLUSH | 250 | 500 | 750 | 1000 | 4000 |
| STRAIGHT FLUSH | 50 | 100 | 150 | 200 | 250 |
| FOUR OF A KIND (ACES) | 100 | 200 | 300 | 400 | 500 |
| FOUR OF A KIND (2'S, 3'S AND 4'S) | 50 | 100 | 150 | 200 | 250 |
| FOUR OF A KIND (5'S THROUGH KINGS) | 25 | 50 | 75 | 100 | 125 |
| FULL HOUSE | 7 | 14 | 21 | 28 | 35 |
| FLUSH | 5 | 10 | 15 | 20 | 25 |
| STRAIGHT | 4 | 8 | 12 | 16 | 20 |
| THREE OF A KIND | 2 | 4 | 6 | 8 | 10 |
| TWO PAIR | 1 | 2 | 3 | 4 | 5 |
| JACKS OR BETTER | 1 | 2 | 3 | 4 | 5 |

SYSTEMS AND METHODS FOR PROVIDING ELECTRONIC GAMING PIECES

CROSS-REFERENCE TO RELATED APPLICATION(S)

This patent application is a continuation of and claims the benefit of priority to U.S. application Ser. No. 17/228,388, filed on Apr. 12, 2021, which is a continuation of U.S. application Ser. No. 15/642,974, filed on Jul. 6, 2017, now U.S. Pat. No. 11,004,311, issued on May 11, 2021, which is a continuation of U.S. application Ser. No. 14/447,319, filed Jul. 30, 2014, now U.S. Pat. No. 9,728,046, issued on Aug. 8, 2017, the entireties of each of which are incorporated herein by reference.

TECHNICAL FIELD

Various embodiments of the present disclosure relate generally to networked gaming systems and methods for playing such games, including, for example, video poker. More specifically, particular embodiments of the present disclosure relate to systems and methods for playing a video poker game in which all the cards in a player's hand are determined by a set of selected numbers. Achieving a specific pattern from a plurality of patterns on a bingo card, against the set of selected numbers, leads to the assignment of a corresponding poker card.

BACKGROUND

Electronic video poker games have been prevalent in gaming casinos for many years. A forerunner of electronic video poker gaming machines is the video Draw Poker machine that deals cards from a standard fifty-two card poker deck and displays a single five card hand to a player. The cards may be dealt based on an electronic shuffle or a random number generator. The player may choose to hold or discard each of the initial five cards that are dealt. For discarded cards, replacement cards are dealt using the starting deck of cards. After replacement of chosen cards from the initial five cards that are dealt, the remaining five cards comprise a player's final five card hand. This final hand is then analyzed based on conventional poker hand rankings. For example, if the player has achieved at least a pair of Jacks or better, the set of cards may be a winning hand. The amount of a player's winning may be determined based on a type of poker hand achieved and an amount of a player's wager.

In video Draw Poker, the conventional poker hand rankings that are winning combinations are a Royal Flush, a Straight Flush, a Four of a Kind, a Full House, a Flush, a Straight, a Three of a Kind, a Two Pair and a Pair of Jacks or Better. A payout table is established based on a number of coins wagered by the player and a type of poker hand achieved.

Some video poker games have modified the classic Draw Poker game to use Jokers, Deuces, or other cards as wild cards. "Jokers Wild" and "Deuces Wild" Draw Poker still display to the player a single five card hand and allow the player to discard unwanted cards and receive replacement cards. The payout table is modified to recognize the differing odds for achieving various poker hands when wild cards are involved. Furthermore, different poker hand rankings are used in the pay table to recognize different winning combinations that can be achieved using wild cards.

However, conventional methods for electronic pokers games use random number generators and electronic shuffles to conduct the initial deal. In addition, traditional electronic poker games do not result in a winner for each game. During each game, the player may win if the player's final hand is one of the selected hands for payout, or the player may lose if the final hand does not result in a hand selected for payout. Conventional electronic poker games also are not games of purely chance (they involve some level of skill), and they are not played against other players (they are played against the "house").

SUMMARY OF THE DISCLOSURE

Embodiments disclose systems and methods for providing playing cards or other gaming icons/symbols for display.

According to some embodiments, computer-implemented methods are disclosed for providing a desired number of playing cards. In an exemplary method, the method includes retrieving a set of numbers for bingo from a database and determining bingo patterns on a number of bingo cards from a library of bingo cards based on the set of numbers, the number of bingo cards equaling the desired number of playing cards. The method further includes selecting corresponding playing cards based on the bingo patterns on the number of bingo cards and providing the corresponding playing cards for display.

According to some embodiments, systems are disclosed for providing a desired number of playing cards. One system includes a memory having processor-readable instructions stored therein and a processor configured to access the memory and execute the processor-readable instructions, which when executed by the processor configures the processor to perform a method. In an exemplary method, the method includes retrieving a set of numbers for bingo from a database and determining bingo patterns on a number of bingo cards from a library of bingo cards based on the set of numbers, the number of bingo cards equaling the desired number of playing cards. The method further includes selecting corresponding playing cards based on the bingo patterns on the number of bingo cards and providing the corresponding playing cards for display.

According to some embodiments, a non-transitory computer readable medium is disclosed as storing instructions that, when executed by a computer, cause the computer to perform a method, the method including retrieving a set of numbers for bingo from a database and determining bingo patterns on a number of bingo cards from a library of bingo cards based on the set of numbers, the number of bingo cards equaling the desired number of playing cards. The method further includes selecting corresponding playing cards based on the bingo patterns on the number of bingo cards and providing the corresponding playing cards for display.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

Figure 1:
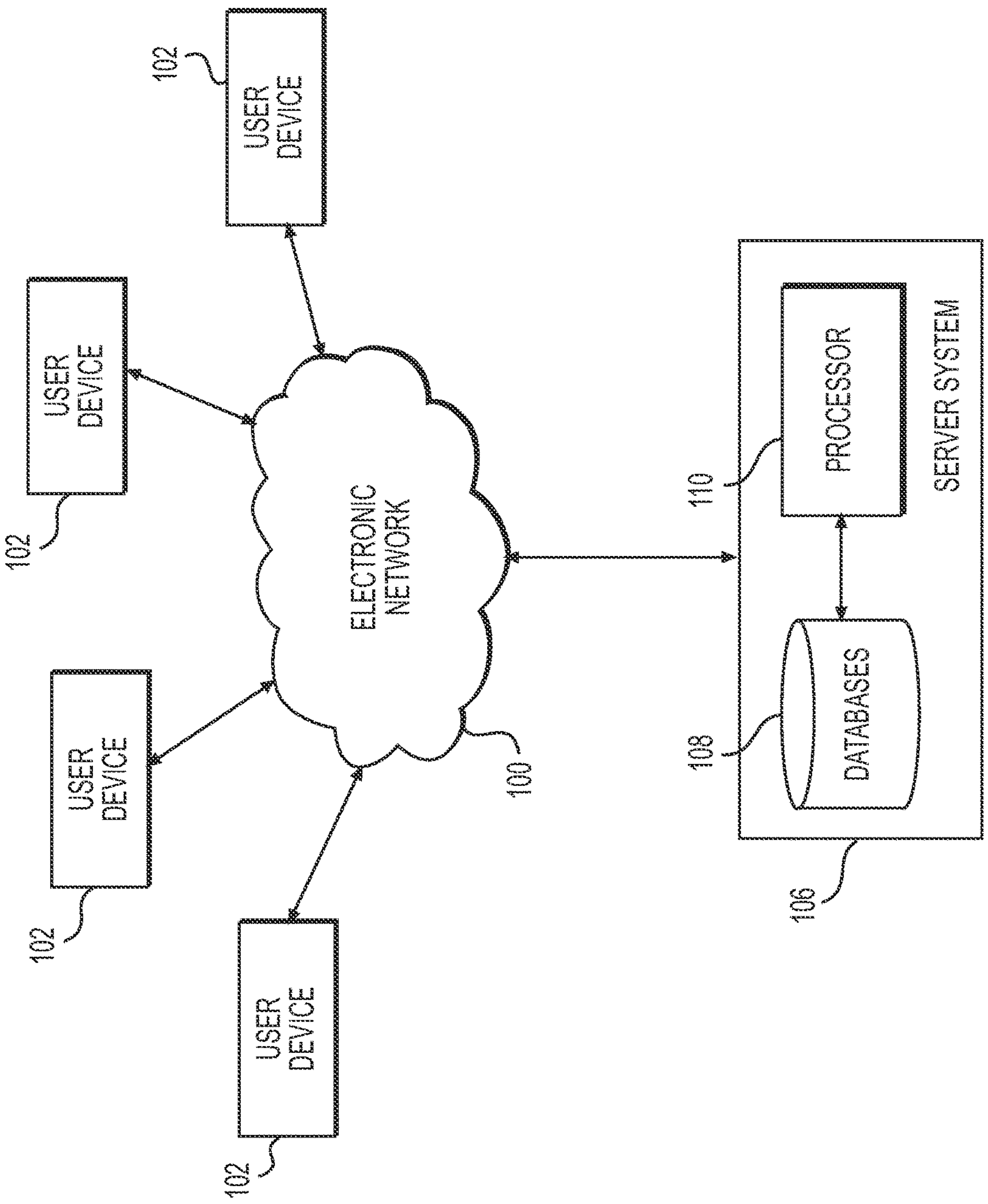
FIG. 1 is a schematic diagram of a network environment for playing a video poker game, according to an embodiment of the present disclosure.

While the present disclosure is described herein with reference to illustrative embodiments for particular applications, it should be understood that embodiments of the present disclosure are not limited thereto. Other embodiments are possible, and modifications can be made to the described embodiments within the spirit and scope of the teachings herein, as they may be applied to the above-noted field of the present disclosure or to any additional fields in which such embodiments would be of significant utility.

In the detailed description herein, references to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is within the knowledge of one skilled in the art to effect such feature, structure, or characteristic in connection with other embodiments whether or not explicitly described.

In view of the challenges and drawbacks associated with the conventional techniques outlined above, systems and methods are disclosed herein for providing playing cards for electronic video poker. In embodiments, systems and methods consistent with embodiments of the present disclosure allow for dealing a hand of playing cards without using an electronic shuffle or random number generator as is done in conventional methods. Instead, in embodiments consistent with the present disclosure, a set of selected numbers and bingo cards are used to determine an initial set of cards and subsequently drawn cards. In detail, if an electronic card game (such as Draw Poker) requires that a player is to be dealt five playing cards, then the player is assigned five bingo cards. Using the set of selected numbers, respective "matching" bingo patterns are achieved on each of the five cards. Each unique pattern corresponds to a playing card in a deck of playing cards. Therefore, based on the respective matching bingo patterns of each of the bingo cards, corresponding playing cards are selected and displayed to a player. Once the cards are displayed to a player, the player may hold or trade the cards. For any cards that are traded, additional bingo cards may be utilized to determine replacement playing cards. The final five playing cards may be used for scoring the hand, for example, in Draw Poker. Accordingly, an exemplary embodiment of the present disclosure allows for dealing an initial hand of playing cards or replacing the playing cards, by using bingo cards and a set of selected numbers instead of the conventional methods of a random number generator or an electronic shuffle.

Another feature of a game according to exemplary embodiments includes playing a game of conventional bingo against other players using the bingo cards that a player has used in one or more video poker games. For example, at a preset or random time of day, a gaming facility (such as a casino) may announce that a bingo game will be played against other players using all or some of the bingo cards that were previously used by the players. A prior poker player may opt into that bingo game using the bingo cards that he or she used during that day or since the last conventional bingo game. A gaming machine within the facility may recognize the player through a form of electronic identification, such as a card, and the machine will load and display the player's bingo cards. A game of conventional bingo may ensue, in which one or more players may win prizes.

The principles of embodiments of the invention may be used for any other video/electronic game that requires a random distribution or selection of symbols or game pieces used in the game. The embodiments described in this disclosure focus on electronic poker involving playing cards as the randomly selected game pieces. Another type of electronic game that can use a set of selected numbers and bingo cards for the selection and distribution of symbols includes traditional video slot machine games, where numbers, bars, bells, and other icons and symbols (such as cherries or other fruit) are distributed, and combinations are used to determine winnings. A further embodiment of an electronic game that can use set of selected numbers s and bingo cards for the selection and distribution of symbols/game pieces includes video blackjack, roulette, baccarat, or any other video/electronic game using playing cards.

Reference will now be made in detail to the exemplary embodiments of the disclosure, examples of which are illustrated in the accompanying drawings. Wherever possible, the same reference numbers will be used throughout the drawings to refer to the same or like parts.

FIG. 1 is a schematic diagram of an exemplary network environment for a gaming system, according to an embodiment of the present disclosure. The gaming system may be used to distribute playing cards or other symbols or game pieces used in other video/electronic gaming systems (such as symbols used in slot machines). As shown in FIG. 1, the environment may include a plurality of user or client devices 102 that may be communicatively coupled to each other as well as one or more server systems 106 via an electronic network 100. Electronic network 100 may include one or a combination of wired and/or wireless electronic networks. Network 100 may also include a local area network, a medium area network, or a wide area network, such as the Internet.

In one embodiment, each of user or client devices 102 may be any type of computing device configured to send and receive different types of content and data to and from various computing devices via network 100. Examples of such a computing device include, but are not limited to, a gaming terminal, a desktop computer or workstation, a laptop computer, a mobile handset, a personal digital assistant (PDA), a cellular telephone, a network appliance, a camera, a smart phone, an enhanced general packet radio service (EGPRS) mobile phone, a media player, a navigation device, a game console, a set-top box, or any combination of these or other types of computing devices having at least one processor, a local memory, a display (e.g., a monitor or touch screen display), one or more user input devices, and a network communication interface. The user input device(s) may include any type or combination of input/output devices, such as a keyboard, touchpad, mouse, touch screen, camera, and/or microphone.

In one embodiment, each of the user or client devices 102 may be configured to execute applications for displaying various types of content and data received from any of server systems 106. Server systems 106 in turn may be configured to receive data related to user interaction with user interfaces displayed in the user or client devices 102. For example, server systems 106 may receive data related to selection or clicking of an item displayed on a gaming application. This may include selection of playing cards to keep or trade, in addition to other selections related to a game of bingo or poker.

Also, as shown in FIG. 1, server systems 106 may include one or more databases 108. In an embodiment, databases 108 may be any type of data store or recording medium that may be used to store any type of data. For example, databases 108 may store information related to bingo cards, poker cards, etc. This may include information regarding what pattern on bingo cards corresponds to which playing card in a deck of poker cards. Databases 108 may also store information related to which cards have been previously used or are currently being played. Additionally, databases 108 may include one or more payout tables. Each of the payout tables may include information related to winning certain amounts for various scenarios in a card game such as Draw Poker. For example, payout tables may indicate that winnings in response to a straight flush may be different for a simple Draw Poker compared to a Deuces Wild poker.

Additionally, as shown in the example of FIG. 1, server systems 106 may include a processor 110. In an embodiment, processor 110 may be configured to execute a process for dealing a set of bingo cards, conducting a set of selected numbers, selecting playing/poker cards from the bingo cards based on patterns associated with the set of selected numbers, and providing poker cards based on the selected cards. In an embodiment, processor 110 may be configured to receive instructions and content from various sources including user or client devices 102 and store the received content within databases 108. In some implementations, any received data may be stored in the databases 108 in an encrypted form to increase security of the data against unauthorized access. Processor 110 or any additional processors within server systems 106 may also be configured to provide content to client or user devices 102 for displaying. The displayed content may include, for example, a poker game layout which also provides the bingo cards corresponding to the poker cards being displayed In embodiments, a user or client device 102 may be a gaming terminal. The gaming terminal may further include a video display screen displaying an interface. Exemplary interfaces are described below in further detail in relation to FIGS. 3A-3C. In embodiments, a gaming terminal may contain a slot machine, token acceptor, bill acceptor, or electronic card reader to initiate a game. In embodiments, the game may be initiated by scanning of any form of identity related to a person or determination that a person holds a certain amount of credit to play games on the gaming terminal.

In embodiments, a gaming terminal may be configured to allow a person to provide an input to initiate a game, deal cards, hold cards, or trade cards (discard cards). Furthermore, the gaming terminal may be configured to allow a person to provide an input for cashing out. Each of these inputs may be provided by way of a physical button located on the gaming terminal or by selection of a corresponding button on an interface presented on the display screen of the gaming terminal.

In embodiments, whenever a player initiates a new deal or attempts to trade a card, a credit check may occur to see if the player has enough credit for the given act. For example, a deal of five cards may require a preset amount of money (e.g., one dollar) for each card and a trade may require zero to two dollars for each card. Accordingly, in an exemplary scenario, if a person requests a deal of a new hand, they must have credit of five dollars. Thereafter, if the player seeks to trade two cards, they must have a credit of four additional dollars.

Figure 2:
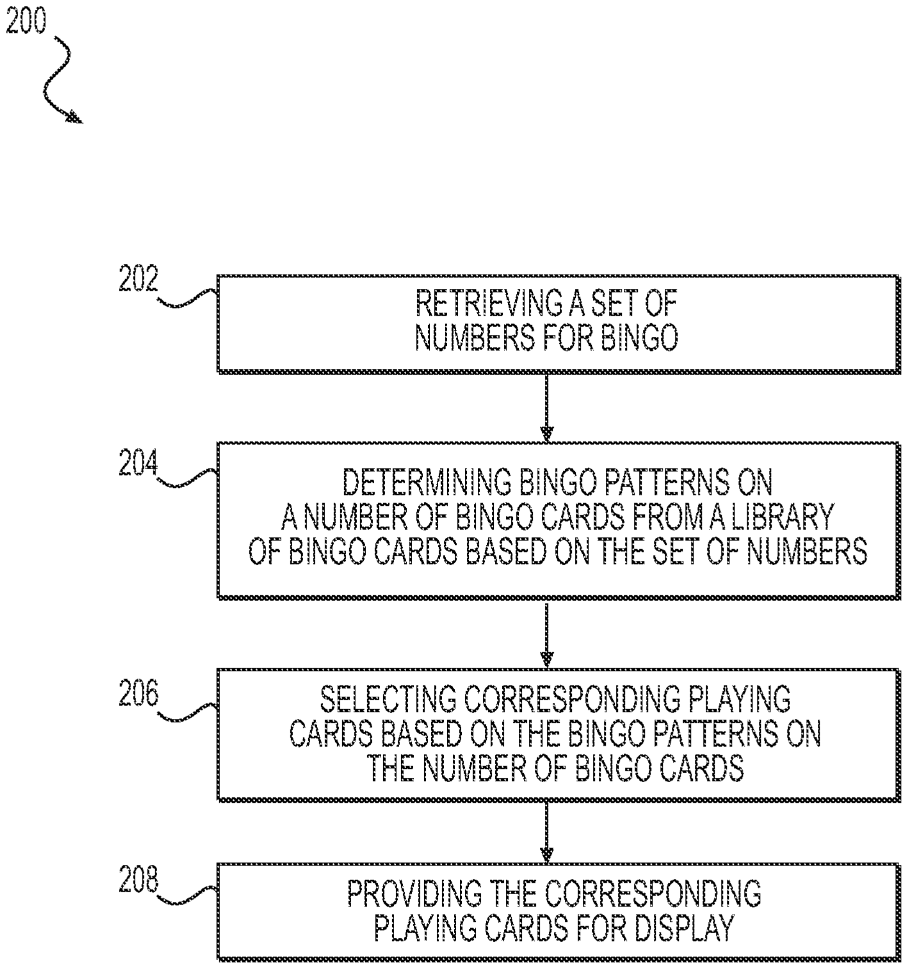
FIG. 2 is a flow diagram of an exemplary method for providing play cards, according to an embodiment of the present disclosure.

FIG. 2 is a flow diagram of a method 200 for providing playing cards, according to an embodiment of the present disclosure. As will be discussed more specifically, in this embodiment, providing a set of playing/poker cards includes selecting a number of bingo cards that corresponds to the number of desired playing cards. The selected number of bingo cards is chosen randomly from a library of bingo cards that may be stored in a memory. Each bingo card can have any suitable size matrix of numbers, e.g. 5×5, 8×8, or any other size matrix including matrices that are not square, e.g. 5×7. The matrix will include numbers that are distributed about the matrix. The range/amount of possible numbers, e.g. 75, may vary according to the application. Each matrix in the library will have a different arrangement of numbers within the matrix, and may have less than the amount of numbers in the matrix. For example, a 5×5 bingo card may have 25 numbers of the 75 possible numbers. As will be described more specifically below, either before or after selecting the bingo cards that correspond to the number of desired playing cards, a group of numbers from the range of possible bingo numbers is selected. The selected bingo cards are then filled in from the set of selected numbers. Each card is filled in one number at a time in the selection order of the set of selected numbers, i.e. the first selected number is located within the bingo card, then the second selected number, and so on. A number of pre-selected matching bingo patterns are set to correspond to the number of cards in a playing deck, i.e. 52. The preselected bingo patterns can be any selected pattern so long as each bingo card in the library will have a distinct matching pattern regardless of the set of selected numbers. This ensures that no two bingo cards will ever result in the same corresponding playing card—so that the same playing card does not turn up in a single game.

The number of playing cards, symbols, or game pieces in the electronic/video game will, at least in part, determine the size of the bingo card matrix, the number of cards in the library, the amount of bingo numbers to select from on each card, the number of players in a game, and the amount of numbers for bingo card matching. Determining these variables, and the variation of numbers on the cards and the matching bingo patterns, is within the skill of a gaming mathematician or analyst. Such a mathematician/analyst may use any known formula, method, or statistical principle to derive these variables. As an example of selecting playing cards, functionality of a random number generator may be mimicked by using a bit mask overlay to create number combinations that would randomly draw five (5) from a pool of fifty-two (52) cards for an opening hand. These drawn playing cards may then be provided for a deal. In another example, functionality of a random number generator may be mimicked to imitate a bonus award sequence in a slot machine, such as, three cherries from a possibility of different symbols.

Turning once again to FIG. 2, in an exemplary embodiment, the method for providing playing cards may entail two general steps. One of ordinary skill in the art would comprehend that the method is described as a two-step process only for ease of comprehension and is not limited to or by a particular number of steps. Accordingly, the first general step (steps 202-204) may entail the bingo aspect of this method. The bingo aspect may include selecting a set of numbers for bingo and determining matching bingo patterns on a predetermined number of cards from a library of bingo cards against the set of selected numbers. For example, a certain amount of numbers may be initially selected from a possible set of numbers. A player, using user or client device 102, may be assigned the predetermined number of cards to play against the numbers initially selected. Playing the bingo cards (which is performed automatically by the system processor) leads to achieving bingo patterns in each of the predetermined number of cards.

The second general step of this exemplary method (steps 206-208), includes determining the playing cards to display. Accordingly, corresponding playing cards may be selected based on the matching bingo patterns of the predetermined number of cards, and then these playing cards may be provided for displaying to a player. For example, each of the 52 playing cards in a deck of playing cards may be assigned a corresponding matching bingo pattern. Accordingly, for each of the matching bingo patterns, the corresponding playing card may be selected and provided for display to a player. This method may allow for utilizing bingo to select playing cards for electronic card games including black jack, regular Draw Poker, Deuces Wild Draw Poker, Joker's Wild Draw Poker, One-Eyed Jacks Wild Draw Poker, Three Card Poker, Let it Ride, Caribbean Stud, etc.

In embodiments, the method for providing playing cards may be initiated in response to receiving a request for bingo cards. For example, a player at a gaming station, such as user or client device 102, may purchase or request cards to play a card game. The gaming station may generate encrypted data that is transmitted to server system 106. Server system 106 may decrypt the encrypted data. Accordingly, the request may be transmitted over electronic network 100 in a secure manner. Server system 106 may then initiate the steps of method 200 in response to information regarding the request for bingo cards in the decrypted data, in addition to performing additional steps. For example, upon receiving a request, before initiating method 200, server system 106 may first conduct a transaction associated with the cards, that is, determine if a user has enough of an account balance associated with the user and subtract an amount corresponding to the request.

In further detail, as shown in FIG. 2, step 202 may include retrieving data related to a selection of a set of numbers for bingo. In embodiments, the set of numbers for bingo may be selected using a traditional numbers selection machine (blower) or a random number generator (RNG). For example, in Bonanza bingo, 45 numbers may be included in a set of selected numbers. However, in embodiments, the amount of numbers to be selected may be dependent on the size of the bingo cards. For example, if five-by-five bingo cards are being used, then a lesser amount of numbers may need to be selected compared to when eight-by-eight bingo cards are being used. Five-by-five and eight-by-eight are exemplary sizes of bingo cards for ease of explanation. The principles of this disclosure may be practiced using bingo cards with various sizes, that is, matrices of various different dimensions.

In embodiments, if a traditional bingo blower is utilized, the set of numbers may be entered manually by a game manager using a user or client device 102. Alternatively, automated systems detecting the set of numbers that is chosen may be used. Information related to what numbers are chosen in the set of selected numbers may then be stored in databases 108. On the other hand, if a random number generator is used, then the random number generator may pick a certain amount of numbers from a preset amount of numbers, according to known methods in the art. For example, from numbers 1-75, forty-five total numbers may be picked in the initial selection of numbers using a random number generator.

Figure 3A:
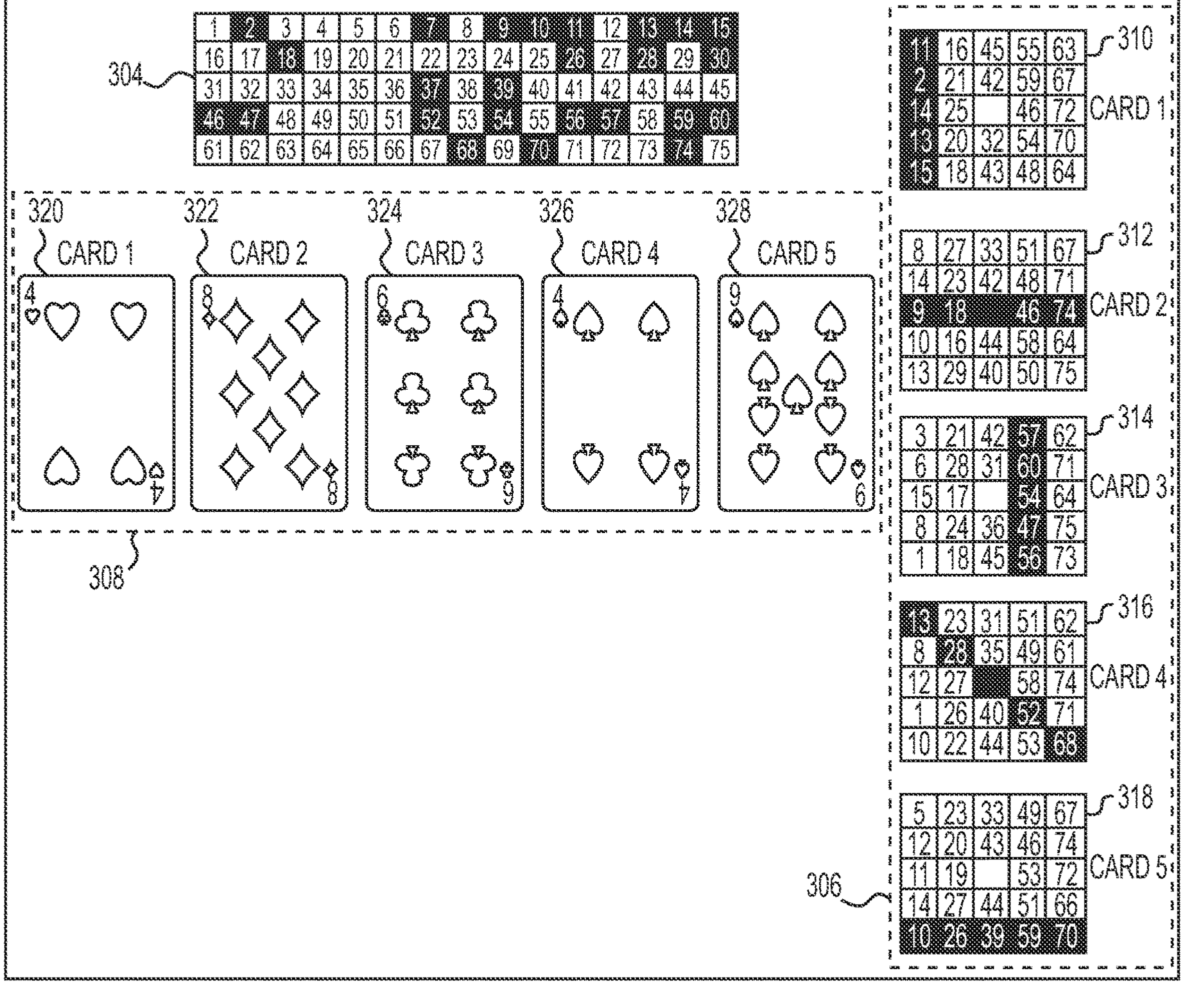
FIGS. 3A-3C illustrate exemplary graphical user interfaces (GUI), according to an embodiment of the present disclosure.

For example, FIG. 3A illustrates an exemplary interface 300, consistent with an exemplary embodiment of the present disclosure. Interface 300 may be displayed on a screen of user or client device 102, which in this exemplary case may be a gaming station. Interface 300 may include payout table 302, selected numbers section 304, bingo cards section 306, and playing cards section 308. Bingo cards section 306 may consist of five bingo cards 310, 312, 314, 316, and 318. Playing cards section 308 may consist of playing cards 320, 322, 324, 326, and 328.

Payout table 302 includes payout information for various scenarios that may be presented to a person viewing a screen of user or client device 102. For example, depending on the number of coins that are bet, a user can determine the payout if the results lead to any of the prescribed scenarios, such as a "Flush" or "Full House." While the exemplary payout table includes number of coins bet ranging from 1-5, payout table 302 may include multiple representative values, as long as they are presented in a method consistent with the teachings of the present disclosure.

Selected numbers section 304 illustrates all the possible numbers that may be selected to be included in the set of selected numbers and the set of numbers that were selected for bingo. In this example, numbers 1-75 are all the possible numbers that may be selected. As a result of using a number selection process or a random number generator (RNG), a predetermined amount of the numbers are selected. The selected numbers are represented by the darkened boxes in selected numbers section 304. Information related to the initial selection of a set of numbers for bingo may be stored in databases 108. This information may then be retrieved from databases 108 and may be displayed on user interface 300 in the form of selected numbers section 304. Bingo cards 310, 312, 314, 316, and 318, along with playing cards 320, 322, 324, 326, and 328 are described in further detail below with respect to the explanation for steps 204 and 206, along with FIGS. 3A-C.

In step 204, method 200 may include determining matching bingo patterns on a predetermined number of cards from a library of bingo cards against the set of selected numbers. The amount of predetermined number of cards may be based on the number of playing cards required for a card game. For example, the predetermined number of cards from the library of bingo cards may be five for Draw Poker. Continuing the example from step 202, the order of the set of selected numbers may be used to simulate playing of bingo for each of the five cards. For example, for a first card, scoring on the first card may be stopped as soon as a matching bingo pattern is achieved. Thereafter, the matching bingo pattern may be dropped from a list of patterns. The process may be repeated for scoring the second card, and so on, until matching bingo patterns are determined on each of the five cards. In embodiments, this process is automated.

Referring back to FIG. 3A, interface 300 includes bingo cards 310, 312, 314, 316, and 318 each with respective matching patterns. The matching patterns are illustrated by the darkened boxes in each of the respective cards. Accordingly, as a presence of a matching pattern is detected in each card, it is selected. Thereafter, the next card is evaluated for matching bingo patterns against a set of selected numbers. Alternatively, all five bingo cards are evaluated simultaneously.

In embodiments, matching bingo patterns are not limited to combinations of 5 boxes in a row. Instead, the matching bingo patterns may be any particular set of preset patterns, and any number of boxes within each pattern. However, a limitation may be imposed on the set of cards or the patterns so that the set of selected numbers always lead to selection of a pattern on every card in the library of bingo cards In step 206, method 200 may include selecting corresponding playing cards based on the matching bingo patterns on the predetermined number of bingo cards. Continuing with the example from step 204, each of the matching bingo patterns corresponds to a playing card. In detail, if there are fifty-two (52) possible playing cards in a deck then there may be fifty-two matching bingo patterns—each matching bingo pattern may be assigned to each unique playing card in the deck. Therefore, corresponding playing cards may be selected by mapping the matching patterns to one of the corresponding playing cards.

Referring back to FIG. 3A, interface 300 includes playing cards 320, 322, 324, 326, and 328 that each correspond to bingo cards 310, 312, 314, 316, and 318 respectively. Therefore, in this example, a bingo pattern of the five-left most boxes in a bingo card, such as in bingo card 310, would always correspond with the four of hearts represented by playing card 320. Accordingly, a four of hearts may not be assigned any additional patterns, while at the same time the pattern of the "five-left most boxes in a bingo card" may not be assigned to any other playing card. There is a one-to-one correspondence between playing cards and matching patterns of a bingo card.

In step 208, method 200 may include providing the corresponding playing cards for display. In detail, the corresponding playing cards may be provided by server 106 to user or client device 102 to display, such as in interface 300 of FIG. 3A.

Figure 3B:
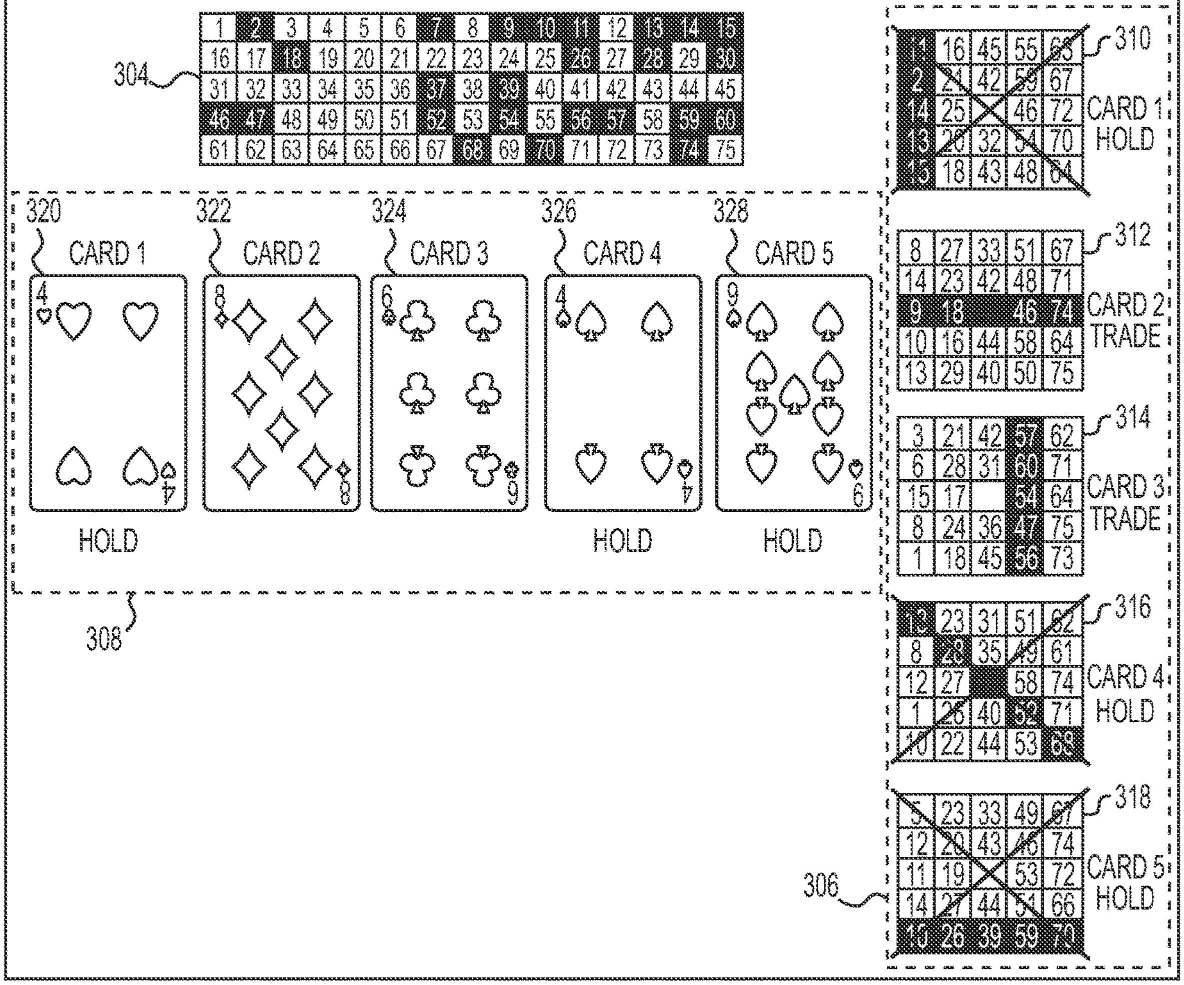

In embodiments, once the cards are displayed in interface 300, a player may be able to request to hold or trade one or all of the displayed cards. A request for a trade for each card may (or may not, depending on the program) cost a player a certain amount of money (or credit) per traded card. For example, FIG. 3B illustrating interface 300 indicates a scenario where a player has chosen to hold playing cards 320, 326, and 328, and trade playing cards 322 and 324. In embodiments, a player may provide an input indicating a decision to hold or trade each of the cards by making selections on interface 300 or using other selection methods that may be available on user or client devices 102. Bingo card section 306 illustrates the impact of a player's selection on the corresponding bingo cards. For example, bingo cards 310, 316, and 318 are marked to be held, while bingo cards 312 and 314 are marked to be traded.

Figure 3C:
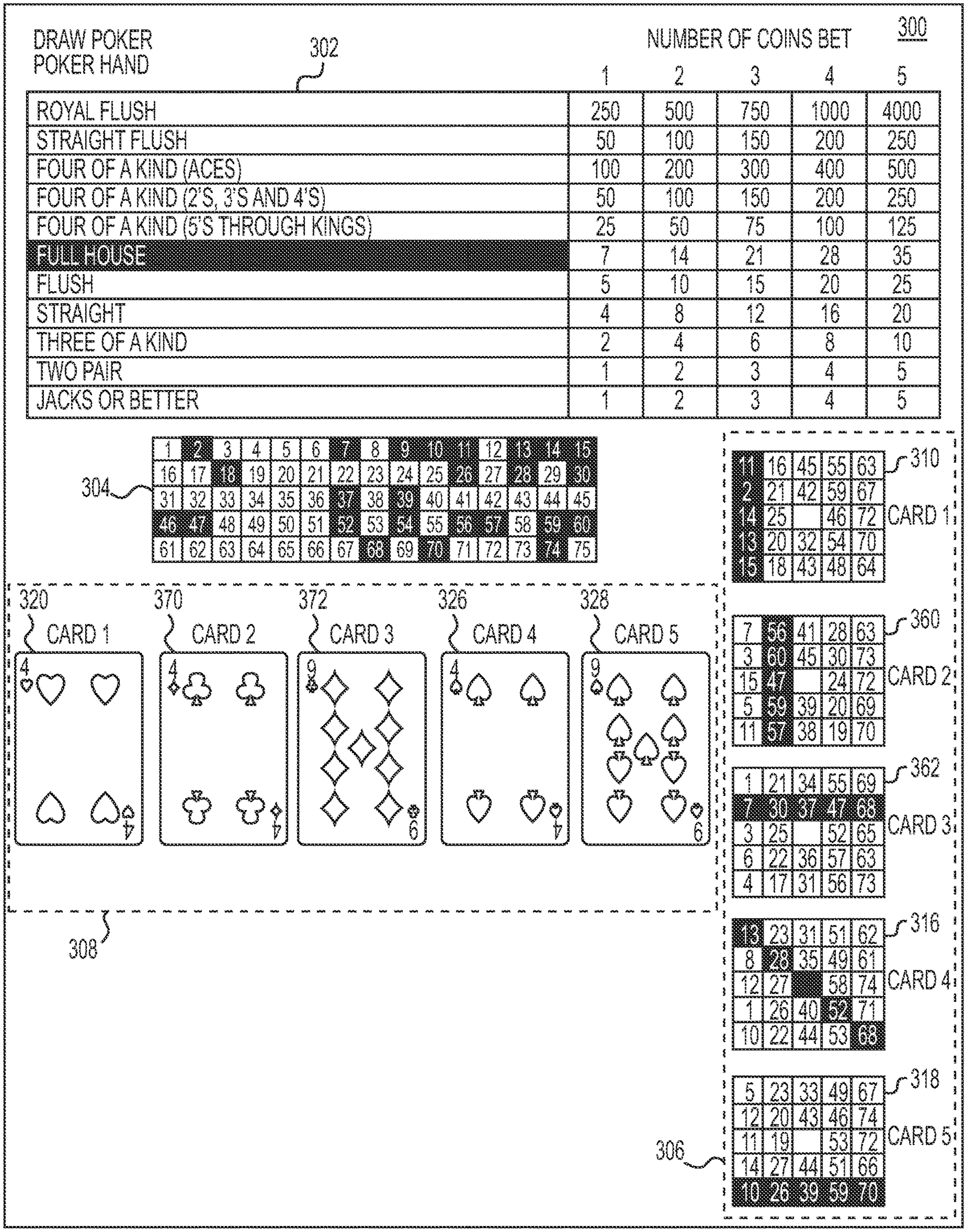

Therefore, in response to receiving data from a gaming station indicating a player's request for trading a card, server system 106 may replace the bingo cards that are to be traded. The process for selection of the replacement cards may be similar to the original selection of the predetermined number of bingo cards from the library of bingo cards. A first exemplary step may entail determining what bingo cards correspond to the selected playing marked for trading. These corresponding bingo cards are then selected for trading with one or more additional bingo cards from a library of bingo cards. Then, the additional bingo cards may be selected from the library of bingo cards to replace the one or more bingo cards that are to be traded. Any bingo cards that were previously considered may not again be considered for a player, so that matching bingo patterns are not repeated. Accordingly, additional matching bingo patterns on each of the additional bingo cards from the library of bingo cards may be determined. This may be conducted similarly to step 204, described in detail above, where based on the set of selected numbers, matching bingo patterns are achieved on the additional bingo cards. The additional matching bingo patterns may be used to select corresponding replacement playing cards similarly to step 206 discussed above. These corresponding replacement cards may then be provided for displaying. For example, FIG. 3C, illustrates that in interface 300, within bingo card section 306, bingo cards 312 and 314 are replaced by replacement bingo cards 360 and 362 respectively. Therefore, bingo cards 360 and 362 serve as the new "Card 2" and "Card 3" respectively. In playing cards section 308, replacement playing cards 370 and 372 represent the corresponding playing cards for bingo cards 360 and 362.

In embodiments, after a player chooses to hold or trade playing cards displayed in playing card section 308, and the replacement cards (if any) have been "dealt," a determination may be made regarding whether the playing cards comprise a winning hand. In the example, provided in FIG. 3C, playing cards 320, 326, 328, 370, and 372, lead to a full house. Accordingly, full house is highlighted in payout table 302. Based on the number of coins that are bet, a player may be credited for the corresponding winning amount in payout table 302.

In embodiments, databases 108 may store information regarding all bingo cards that are selected or drawn for a player over a certain period of time, for example a day or a week. This information may be retrieved by the player to play Bingo Bonanza, or another conventional bingo game, according to embodiments. For example, a casino may complete a Bingo Bonanza game each night at a preset time, for example 10 p.m., taking into account the set of initially selected numbers. Typical to Bingo Bonanza, on top of the set of initially selected numbers, additional numbers may be selected one-by-one by a random number generator or a numbers selecting machine. All of a player's bingo cards may then be played conventionally like in Bingo Bonanza. As certain patterns appear on the player's bingo cards, additional awards or prizes may be awarded. This allows players not only to utilize bingo cards for playing poker but also to use the same cards for playing a complete game of Bingo Bonanza against other players until a bingo winner or winners are determined.

The examples described above with respect to FIGS. 1-3C, or any part(s) or function(s) thereof, may be implemented using hardware, software modules, firmware, tangible computer readable media having instructions stored thereon, or a combination thereof and may be implemented in one or more computer systems or other processing systems.

Figure 4:
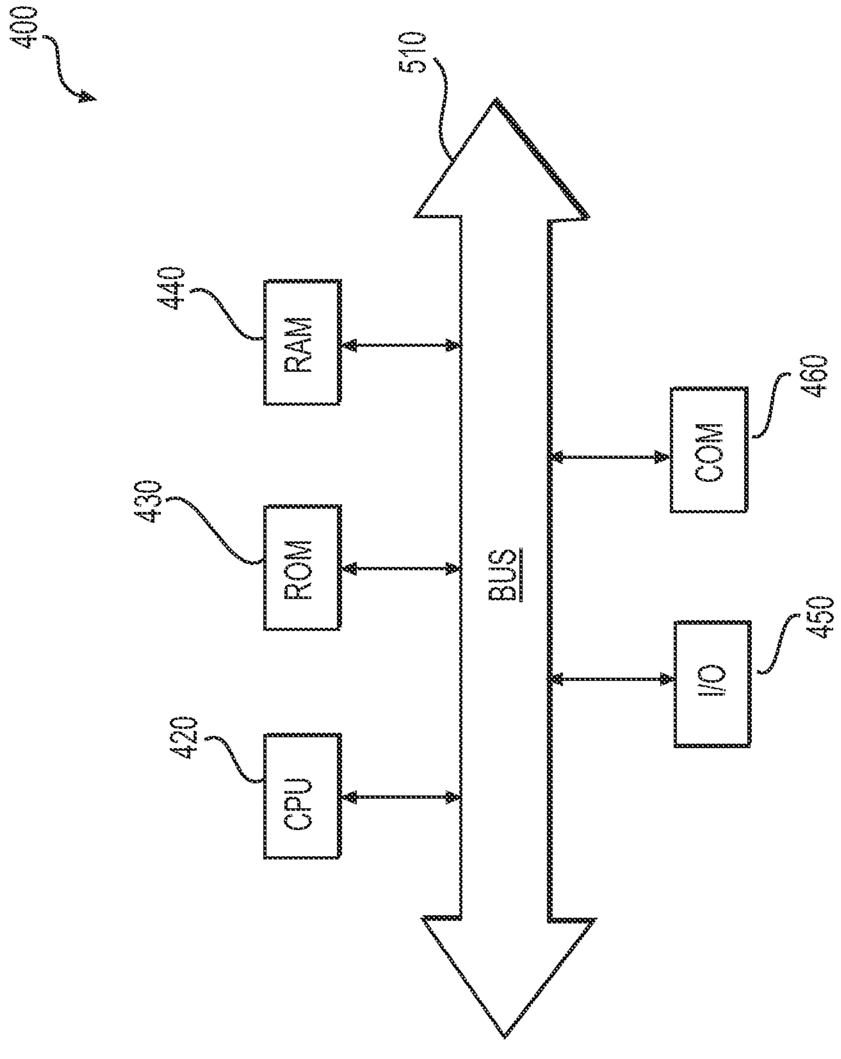
FIG. 4 is a block diagram of an exemplary computer system in which embodiments of the present disclosure may be implemented.

FIG. 4 illustrates a high-level functional block diagram of an exemplary computer system 400, in which embodiments of the present disclosure, or portions thereof, may be implemented, e.g., as computer-readable code. For example, each of the exemplary devices and systems described above with respect to FIG. 1 can be implemented in computer system 400 using hardware, software, firmware, tangible computer readable media having instructions stored thereon, or a combination thereof and may be implemented in one or more computer systems or other processing systems. Hardware, software, or any combination of such may embody any of the modules and components in FIG. 1, as described above.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor, a plurality of processors, or combinations thereof. Processor devices may have one or more processor "cores."

Various embodiments of the present disclosure, as described above in the examples of FIGS. 1-4 may be implemented using computer system 400. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 4, computer system 400 includes a central processing unit (CPU) 420. CPU 420 may be any type of processor device including, for example, any type of special purpose or a general-purpose microprocessor device. As will be appreciated by persons skilled in the relevant art, CPU 420 also may be a single processor in a multi-core/multiprocessor system, such system operating alone, or in a cluster of computing devices operating in a cluster or server farm. CPU 420 is connected to a data communication infrastructure 510, for example, a bus, message queue, network, or multi-core message-passing scheme.

Computer system 400 also includes a main memory 440, for example, random access memory (RAM), and may also include a secondary memory 430. Secondary memory 430, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc. which is read by and written to by the removable storage drive. As will be appreciated by persons skilled in the relevant art, such a removable storage unit generally includes a computer usable storage medium having stored therein computer software and/or data.

In alternative implementations, secondary memory 430 may include other similar means for allowing computer programs or other instructions to be loaded into computer system 400. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to computer system 400.

Computer system 400 may also include a communications interface ("COM") 460. Communications interface 460 allows software and data to be transferred between computer system 400 and external devices. Communications interface 460 may include a modem, a network interface (such as an Ethernet card), a communications port, a PCMCIA slot and card, or the like. Software and data transferred via communications interface 460 may be in the form of signals, which may be electronic, electromagnetic, optical, or other signals capable of being received by communications interface 460. These signals may be provided to communications interface 460 via a communications path of computer system 400, which may be implemented using, for example, wire or cable, fiber optics, a phone line, a cellular phone link, an RF link or other communications channels.

The hardware elements, operating systems, and programming languages of such equipment are conventional in nature, and it is presumed that those skilled in the art are adequately familiar therewith. Computer system 400 also may include input and output ports 450 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

It would also be apparent to one of skill in the relevant art that the present disclosure, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

It is to be understood that both the foregoing general description and the following detailed description are exemplary and explanatory only and are not restrictive of the disclosed embodiments, as claimed.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for providing a desired number of playing cards, the method comprising:
- selecting, using at least one processor, corresponding playing cards based on an association between playing cards and bingo patterns on each bingo card among a library of bingo cards, wherein the bingo patterns are based on a set of numbers for bingo;
- upon initiation of a game by a physical user interface of a gaming terminal or an electronic user interface of the gaming terminal, providing, using the at least one processor, the corresponding playing cards for display on a video display screen of the gaming terminal;
- replacing, using the at least one processor, one or more of the number of bingo cards with additional bingo cards from the library of bingo cards;
- selecting, using the at least one processor, corresponding replacement playing cards based on additional bingo patterns on the additional bingo cards; and
- providing, using the at least one processor, the corresponding replacement cards for display.

2. The computer-implemented method of claim 1, wherein the number of bingo cards equals the desired number of playing cards.

3. The computer-implemented method of claim 1, further comprising:
- selecting additional numbers from the set of numbers; and
- determining bingo game patterns on the number of bingo cards and the additional bingo cards based on the additional numbers, the determined bingo game patterns differing from the bingo patterns and the additional bingo patterns.

4. The computer-implemented method of claim 3, wherein the determined bingo patterns include additional patterns having a larger amount of boxes in a matrix than the bingo patterns and the additional bingo patterns.

5. The computer-implemented method of claim 1, wherein replacing one or more of the number of bingo cards with additional bingo cards from the library of bingo cards comprises replacing the one or more of the number of bingo cards with the additional bingo cards from the library of bingo cards in response to receiving data indicating a request for such replacement.

6. The computer-implemented method of claim 1, further comprising:
- generating the set of numbers by selecting a pre-set amount of numbers from a pool of numbers, before a bingo pattern is determined on any of the number of bingo cards.

7. The computer-implemented method of claim 6, further comprising:
- generating the library of bingo cards based, at least in part, on the pool of numbers, each bingo card in the library of bingo cards having a unique bingo pattern for the set of numbers.

8. A computer-implemented method for providing a desired number of playing cards, the method comprising:
- selecting, using at least one processor, corresponding playing cards based on an association between the playing cards and patterns on each matrix among a library of matrices, wherein the patterns are based on a set of indicia;
- upon initiation of a game by a physical user interface of a gaming terminal or an electronic user interface of the gaming terminal, providing, using the at least one processor, the corresponding playing cards for display on a video display screen of the gaming terminal;
- replacing, using the at least one processor, one or more of the number of matrices with additional matrices from the library of matrices;
- selecting, using the at least one processor, corresponding replacement playing cards based on additional patterns on the additional matrices; and
- providing, using the at least one processor, the corresponding replacement cards for display.

9. The computer-implemented method of claim 8, wherein the number of matrices equals the desired number of playing cards.

10. The computer-implemented method of claim 8, wherein each indicium of the set of indicia is a number.

11. The computer-implemented method of claim 8, wherein at least one of the matrices is a square arrangement of indicia.

12. The computer-implemented method of claim 8, wherein at least one of the matrices is a non-square arrangement of indicia.

13. The computer-implemented method of claim 8, further comprising:
- generating the set of indicia by selecting a pre-set amount of indicia from a pool of indicia, before a pattern is determined on any of the number of matrices.

14. A computer-implemented method for providing a desired number of playing cards, the method comprising:
- selecting, using at least one processor, corresponding playing cards based on an association between playing cards and patterns on each matrix among a library of matrices, wherein the patterns are based on a set of numbers;
- providing, using the at least one processor, the corresponding playing cards for display on a video display screen of a gaming terminal, wherein the game is initiated by a physical user interface of the gaming terminal or an electronic user interface of the gaming terminal;
- replacing, using the at least one processor, one or more of the number of matrices with additional matrices from the library of matrices;
- selecting, using the at least one processor, corresponding replacement playing cards based on additional patterns on the additional matrices; and
- providing, using the at least one processor, the corresponding replacement cards for display.

15. The computer-implemented method of claim 14, wherein the number of matrices equals the desired number of playing cards.

16. The computer-implemented method of claim 14, further comprising:
- selecting additional numbers from the set of numbers; and determining patterns on the number of matrices and the additional matrices based on the additional numbers, the determined patterns differing from the patterns and the additional patterns.

17. The computer-implemented method of claim 16, wherein the determined patterns include additional patterns having a larger amount of matched numbers than the patterns and the additional patterns.

18. The computer-implemented method of claim 14, wherein at least one of the matrices is a non-square arrangement of indicia.

19. The computer-implemented method of claim 14, wherein replacing one or more of the number of matrices with additional matrices from the library of matrices comprises replacing the one or more of the number of matrices with the additional matrices from the library of matrices in response to receiving data indicating a request for such replacement.

20. The computer-implemented method of claim 14, further comprising:

generating the set of numbers by selecting a pre-set amount of numbers from a pool of numbers, before a pattern is determined on any of the number of matrices.

21. The computer-implemented method of claim 20, further comprising:

generating the library of matrices based, at least in part, on the pool of numbers, each matrix in the library of matrices having a unique pattern for the set of numbers.

22. A gaming terminal for providing a desired number of playing cards, the gaming terminal comprising:

a video display screen displaying an interface;

a memory having processor-readable instructions stored therein; and a processor configured to access the memory and execute the processor-readable instructions, which when executed by the processor configures the processor to perform a method, the method comprising:

selecting corresponding playing cards based on an association between playing cards and patterns on each matrix among a library of matrices, wherein the patterns are based on a set of numbers for bingo;

providing the corresponding playing cards for display on the video display screen;

replacing one or more of the number of matrices with additional matrices from the library of matrices;

selecting corresponding replacement playing cards based on additional patterns on the additional matrices; and providing the corresponding replacement cards for display.

23. The gaming terminal of claim 22, wherein the number of matrices equals the desired number of playing cards.

24. The gaming terminal of claim 22, further comprising:

selecting additional numbers from the set of numbers; and determining patterns on the number of matrices and the additional matrices based on the additional numbers, the determined patterns differing from the patterns and the additional patterns.

25. The gaming terminal of claim 24, wherein the determined patterns include additional patterns having a larger amount of matched numbers than the patterns and the additional patterns.

26. The gaming terminal of claim 22, wherein at least one of the matrices is a non-square arrangement of indicia.

27. The gaming terminal of claim 22, further comprising one of a token acceptor, a bill acceptor, an electronic card reader, a button, or an input on the video display screen to initiate a game.

28. The gaming terminal of claim 22, wherein replacing one or more of the number of matrices with additional matrices from the library of matrices comprises replacing the one or more of the number of matrices with the additional matrices from the library of matrices in response to receiving data indicating a request for such replacement.

29. The gaming terminal of claim 22, further comprising:

generating the set of numbers by selecting a pre-set amount of numbers from a pool of numbers, before a pattern is determined on any of the number of matrices.

30. The gaming terminal of claim 29, further comprising:

generating the library of matrices based, at least in part, on the pool of numbers, each matrix in the library of matrices having a unique pattern for the set of numbers.

* * * * *